(12) United States Patent
Almkvist et al.

(10) Patent No.: US 7,621,240 B2
(45) Date of Patent: Nov. 24, 2009

(54) INTERNAL COMBUSTION ENGINE AND METHOD OF CONTROL

(75) Inventors: Goran Almkvist, Lerum (SE); Hans Strom, Kode (SE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/925,502

(22) Filed: Oct. 26, 2007

(65) Prior Publication Data
US 2008/0134999 A1 Jun. 12, 2008

(30) Foreign Application Priority Data
Dec. 6, 2006 (EP) .................. 06125532

(51) Int. Cl.
*F02B 75/20* (2006.01)

(52) U.S. Cl. .................. 123/58.8; 123/90.15

(58) Field of Classification Search .......... 123/58.7, 123/58.8, 316, 90.15–90.18
See application file for complete search history.

(56) References Cited

U.S. PATENT DOCUMENTS

| 1,830,197 | A | | 11/1931 | Felbeck | |
|---|---|---|---|---|---|
| 4,033,302 | A | * | 7/1977 | Jarnuszkiewicz | 123/534 |
| 4,194,472 | A | * | 3/1980 | Amano et al. | 123/58.8 |
| 4,256,064 | A | * | 3/1981 | Thorn | 123/58.8 |
| 4,422,430 | A | * | 12/1983 | Wiatrak | 123/58.8 |
| 4,787,343 | A | * | 11/1988 | Tuckey | 123/58.8 |
| 6,164,071 | A | * | 12/2000 | Shao et al. | 123/568.12 |
| 6,877,464 | B2 | | 4/2005 | Hitomi et al. | |
| 7,017,561 | B1 | * | 3/2006 | Liu et al. | 123/568.12 |
| 7,280,910 | B2 | * | 10/2007 | Miyamoto et al. | 123/350 |
| 2005/0183693 | A1 | * | 8/2005 | Yang et al. | 123/90.15 |
| 2006/0016417 | A1 | * | 1/2006 | Kuo et al. | 123/90.15 |
| 2006/0144356 | A1 | * | 7/2006 | Sellnau et al. | 123/90.16 |

FOREIGN PATENT DOCUMENTS

| FR | 2275650 | 1/1976 |
|---|---|---|
| WO | 8300536 | 2/1983 |
| WO | 9428300 | 12/1994 |

* cited by examiner

*Primary Examiner*—Noah Kamen
(74) *Attorney, Agent, or Firm*—Allan J. Lippa; Alleman Hall McCoy Russell & Tuttle LLP

(57) ABSTRACT

The invention relates to an internal combustion engine comprising at least two cylinders, at each of which at least one inlet for at least one combustion ingredient is provided. The engine comprises communication means, adapted to provide communication between at least a first of the cylinders, at which a first piston is provided, and a second of the cylinders, at which a second piston is provided, during at least a part of an engine operation period starting during a movement of the first piston towards a bottom dead center (BDC) position at a work stroke of the first cylinder and ending during a movement of the first piston away from the bottom dead center (BDC) position, during which engine operation period the second piston moves towards a bottom dead center (BDC) position and/or away from the bottom dead center (BDC) position.

16 Claims, 5 Drawing Sheets

INTERNAL COMBUSTION ENGINE AND METHOD OF CONTROL

The present application claims priority to European Patent Application No. 06125532.9, filed Dec. 6, 2006, titled "AN INTERNAL COMBUSTION ENGINE, A METHOD IN SUCH AN ENGINE, AND A METHOD FOR PRODUCING SUCH AN ENGINE", the entire contents of each of which are incorporated herein by reference.

TECHNICAL FIELD

The present invention relates to an internal combustion engine, a method in an internal combustion engine, and a method for producing an internal combustion engine. The engine comprises at least two cylinders, each of which has at least one inlet for at least one combustion ingredient to be provided into the cylinders.

BACKGROUND

For internal combustion engines Homogenous Charge Compression Ignition (HCCI) has a big potential in reducing the fuel consumption. In vehicles, compared to spark ignition (SI) operation, a fuel reduction of about 20% could be achieved if it would be possible to run the engine in HCCI throughout the operating range normally used in a vehicle, as defined in the EU test cycle for cars.

In HCCI, the combustion mixture may have a relatively low fuel content. The reason is that the maximum temperature during combustion has to stay within a range. The lower end of the temperature range may be set by the minimum temperature needed for compression ignition. The upper end of the range may be set to limit nitrogen oxide (NOx) formation. The low fuel content can be achieved by high air content or by re-circulating exhaust gases. However, the low fuel content may restrict the maximum torque of the engine, which means that during normal operation, a large number of mode switches between HCCI and SI may be performed. In addition, HCCI is also restricted from operation in low torque operating regions since the high air content or re-circulated exhaust gases results in the temperature being too low for compression ignition to take place.

A number of suggestions have been presented to extend the torque range of the HCCI operation. So called boosted HCCI utilizes a special compressor for increasing the maximum torque limit, but results in a complicated and costly solution. Another suggested solution is a negative overlap of exhaust and inlet valves, but this requires extra fuel injection to control combustion which leads to increased wall heat losses, which in turn deteriorates fuel efficiency.

U.S. Pat. No. 6,877,464 B2 describes an internal combustion engine with intercylinder gas channels between pairs of cylinders with overlapping exhaust and induction strokes, so that, during one operational mode, burned gas from a preceding cylinder can be introduced in a following cylinder. Thereby, spark ignition takes place in the preceding cylinder and compression ignition takes place in the following cylinder.

A disadvantage with this solution is that the intercylinder gas channels are controlled by valves sharing camshafts with ordinary inlet and exhaust valves, which limits the possibility to regulate, for example by variable valve timing, the intercylinder gas channel timing without affecting the timing of ordinary inlet and exhaust valves. Another disadvantage is that only half of the cylinders can operate in a HCCI mode, which limits the fuel consumption reduction allowed by HCCI.

Besides in HCCI, in normal SI Otto cycles and in diesel operation, exhaust gas recirculation (EGR) may be used in order to reduce nitrogen oxide (NOx) emissions. However, specifically during diesel operation, known solutions may limit the amount of exhaust gases introduced into the cylinders, so that it is less than desired.

SUMMARY

It is an object of the invention to reduce emissions from internal combustion engines. Another object of the invention is to reduce the fuel consumption of the internal combustion engines. It is a further object of the invention to make it possible to increase the amount of combustion products introduced into a fresh mixture in an internal combustion engine. It is also an object of the invention to expand the operating range for HCCI.

These objects are reached by an internal combustion engine comprising at least two cylinders, at each of which at least one inlet for at least one combustion ingredient is provided, the engine comprising communication means, adapted to provide communication between at least a first of the cylinders, at which a first piston is provided, and a second of the cylinders, at which a second piston is provided, during at least a part of an engine operation period starting during a movement of the first piston towards a bottom dead center position at a work stroke of the first cylinder and ending during a movement of the first piston away from the bottom dead center position, during which engine operation period the second piston moves towards a bottom dead center position and/or away from the bottom dead center position.

As can be easily appreciated, the movement of the first piston away from the bottom dead center position, during which movement the engine operation period ends, follows immediately upon the movement of the first piston towards the bottom dead center position.

Preferably, the movement, during the engine operation period, of the second piston towards a bottom dead center position takes place at an inlet stroke of the second cylinder, and the movement during the engine operation period of the second piston away from the bottom dead center position takes place at a compression stroke of the second cylinder.

Communication via the communication means is preferably provided after the first piston has passed the top dead center position, and is preferably terminated before the first piston has once again reached the top dead center position.

As described further below, the communication means can be provided as a duct, a channel or any other suitable arrangement adapted for transporting gases between the first and second cylinders.

One of the combustion ingredients is air and, in the case of non-direct fuel injection, a further combustion ingredient is fuel. The at least one combustion ingredient is allowed into the respective cylinder via the respective inlet under the control of a respective inlet valve. This means that the inlet of air can be controlled independently of the gas transportation from the first cylinder to obtain an optimal mix of air, exhaust gases and fuel in the second cylinder.

It should be noted that here, the work stroke and the inlet stroke are defined as periods during which the piston moves downward from the top to the bottom dead center position (BDC), regardless of positions of the inlet valve(s) and the exhaust valve(s) during this downward movement. Similarly, here, the exhaust stroke and the compression stroke are defined as periods during which the piston moves upward from the bottom to the top dead center position (TDC), regardless of positions of the inlet valve(s) and the exhaust valve(s) during this upward movement. Thus, the communication means can be adapted to provide communication between the first and the second cylinder during at least a part of a work stroke of the first cylinder, and at least a part of an inlet stroke of the second cylinder. According to a preferred embodiment of the invention, the communication means is also adapted to provide communication between the first and the second cylinder during at least a part of an exhaust stroke of the first cylinder, and at least a part of a compression stroke of the second cylinder.

Since, during at least the end of the work stroke of the first cylinder, the pressure is higher in the first cylinder than in the second cylinder, operating in the inlet stroke, a large amount of combustion products can be allowed to enter the second cylinder. In personal vehicle internal combustion engines, the pressure in a cylinder at the end of the work stroke can vary, normally between 2-8 bars, approximately 4 bars being a typical value. Further, at least in operations without air charging, the pressure at the end of the inlet stroke is typically 1 bar or less. Thus, the invention provides for a "supercharge" of combustion products into the second cylinder, so that an effective cooling of the combustion in the second cylinder can be obtained, i.e. an effective reduction of the maximum combustion temperature is achieved. This makes it possible to allow HCCI combustion with a high amount of fuel without exceeding the maximum temperature set by nitrogen oxide (NOx) emissions limitations.

The communication means is an arrangement which is separate from the inlet for at least one combustion ingredient, i.e. air and possibly fuel. More specifically, independently of the communication means, air is allowed into the second cylinder during the inlet stroke thereof via the inlet under the control of at least one inlet valve. This means that the admission of air can be controlled independently of the gas transportation through the communication means. Thus, in the second cylinder, during a part of the inlet stroke air can be allowed into the cylinder while no communication is allowed via the communication means. At the end of the inlet stroke, highly pressurized combustion products from the first cylinder can be allowed into the second cylinder. In this way, if the communication means is opened at a late stage of the inlet stroke, e.g. 150 CA after the top dead center position, a large amount of air can be allowed into the second cylinder, whereupon combustion products are pushed into the second cylinder. In this way, the invention allows a volumetric efficiency of up to 90%, and in addition 60-70% of combustion products in the mixture. Compared to known art solutions, this will provide for the maximum torque with HCCI to be increased 2-4 times.

It should be noted that the effects of the invention represent a substantial improvement compared to known art solutions. As an example, with the above mentioned U.S. Pat. No. 6,877,464 B2 it is not possible to reach the favorable engine operation of the invention. In this known solution, no fresh air is introduced into the cylinder working in HCCI mode. Instead, a mixture of combustion products and air remaining from a previous combustion is introduced, so that only a very moderate volumetric efficiency can be reached.

It should also be noted that the invention can be advantageously used also in normal SI (spark ignition) operation, and also in diesel cycles. Compared to normal exhaust gas recirculation (EGR), the invention can provide a high volumetric efficiency while still providing a substantial amount of combustion products before combustion. In diesel operation, preferably cooling means are provided at the communication means, as described in further detail below.

The communication means can be adapted to provide communication between the first and the second cylinder during at least a part of an exhaust stroke of the first cylinder, and at least a part of a compression stroke of the second cylinder. This can be done in addition to, or as an alternative to providing communication between the first and the second cylinder during at least a part of a work stroke of the first cylinder, and at least a part of an inlet stroke of the second cylinder. Thereby, the communication is preferably provided in the beginning of the exhaust stroke of the first cylinder and the compression stroke of the second cylinder. More specifically, communication is terminated before the respective pistons are at positions of 90 CA (crankshaft angles) before the top dead center positions. Thereby, it is possible to introduce fresh air into the second cylinder during a substantial, or even the entire duration of the inlet stroke, whereupon combustion products can be introduced at least partly during the initial phase of the exhaust stroke of the first cylinder and the initial phase of the compression stroke of the second cylinder.

The high volumetric efficiency combined with the high ratio of combustion products introduced before combustion, achievable by the invention, makes it possible to achieve an internal combustion engine operation with reduced emissions and fuel consumption, regardless whether the engine is operated in a SI, diesel or HHCI mode. Especially in diesel operation, the invention can provide for great emission reductions.

Preferably, the engine operation period, during at least a part of which communication is provided by the communication means, starts at 100 crankshaft degrees, more preferably at 75 crankshaft degrees, before the bottom dead center position of the first piston. Preferably, the engine operation period, during at least a part of which communication is provided by the communication means, ends at 100 crankshaft degrees, more preferably at 75 crankshaft degrees, after the bottom dead center position of the first piston.

Preferably, the phase difference of the cycles in the first and second cylinders is approximately 360 crankshaft degrees (CA). More generally, the pistons in the first and second cylinders move essentially in parallel. Thereby, the work cycle in the first cylinder will overlap the inlet cycle in the second cylinder, and vice versa.

Preferably, communication via the communication means is allowed alternately during on one hand at a work stroke of the first cylinder, and at an inlet stroke of the second cylinder, and on the other hand at an inlet stroke of the first cylinder, and at a work stroke of the second cylinder. This provides for an effective and continuous use of all cylinders for HCCI operation, as well as for SI or diesel operation, in the advantageous manner made possible by the invention, while using the same communication means for transportation both ways between the first and second cylinders, which in turn allows for a simple construction.

In general, the communication means can open into the respective cylinders via the air inlet(s) and/or the exhaust outlet(s) provided in the cylinders. However, preferably, the communication means open into the first and second cylinder separately from any air (and fuel) inlet and exhaust outlet provided at the cylinders. In a preferred embodiment at least one first and at least one second opening to the communication means are located at the cylinder wall of the first and second cylinder, respectively, the first and second opening not being exposed to the combustion chamber when the respective piston is at the top dead center position, and at least partly exposed when the respective piston is at the bottom dead center position. This provides for the respective pistons to sweep during their reciprocating movements over the first and second openings, respectively, to prevent communication between the first and second cylinders at the top dead center piston positions, and allow communication at the bottom dead center piston positions.

Preferably, the piston movements in the first and second cylinders are related to each other so that when the first opening is at least partly exposed, the second opening is also at least partly exposed. Preferably, the cycles in the first and second cylinders are related to each other in such a way that the openings in the respective cylinders become essentially simultaneously exposed at a work stroke of one of the first and second cylinders and at an inlet stroke of the other of the first and second cylinders.

Thus, the communication means is exposed when the pistons are located at least in the vicinity of the bottom dead center, so that it can transport combustion products from one of the first and second cylinders to the other of the first and second cylinders.

Preferably, at each communication means at least one valve device is provided and is controllable so as to selectively prevent communication via the communication means. Thereby, communication between the first and second cylinders can be blocked when not desired, for example in at least some of an SI operation mode.

Preferably, as exemplified below, the communication means comprises a conduit located substantially externally of an engine block of the engine.

The objects above are also reached with a method in an internal combustion engine according to the invention, comprising the step of adjusting the timing of the closing of an inlet valve at the inlet of the second cylinder to control the amount of products transported through the communication means. Alternatively, or in addition, a method in an internal combustion engine according to the invention could comprise the step of adjusting the timing of the opening of an exhaust valve at an outlet of the first cylinder to control the amount of products transported through the communication means.

The object of expanding the operating range for HCCI is also reached with a method in an internal combustion engine according to the invention, comprising the step of adjusting a throttle valve so as to reduce the air flow through the inlet of the second cylinder during an inlet stroke thereof. In combination with the transport of combustion products through the communication means, this will provide for an elevation of the temperature in the cylinder receiving the combustion products, which in turn makes it possible to achieve a temperature sufficient for self-ignition in HCCI operation. Thus, the minimum torque level possible with HCCI operation can be reduced.

Another aspect of the invention provides a method for producing an internal combustion engine according to the invention, comprising the steps of providing an engine block with at least two cylinder bores, providing at each cylinder bore at least one aperture providing communication between the respective cylinder bore and an external surface of the engine block, and providing between the apertures of cylinder bores for a first and a second cylinder a conduit so as to provide communication between the apertures of the cylinder bores for the first and the second cylinder. Thus, the conduit is located externally of the engine block, and therefore, the communication means can be provided in a simple and cost-effective manner as a "bolt-on" solution to existing engine models. Preferably, at least one valve device is fitted on each conduit.

BRIEF DESCRIPTION OF THE FIGURES

Below, the invention will be described in detail with reference to the drawing, in which FIG. 1 schematic top view of a part of an internal combustion engine according to one embodiment of the invention.

DETAILED DESCRIPTION

Figure 1:
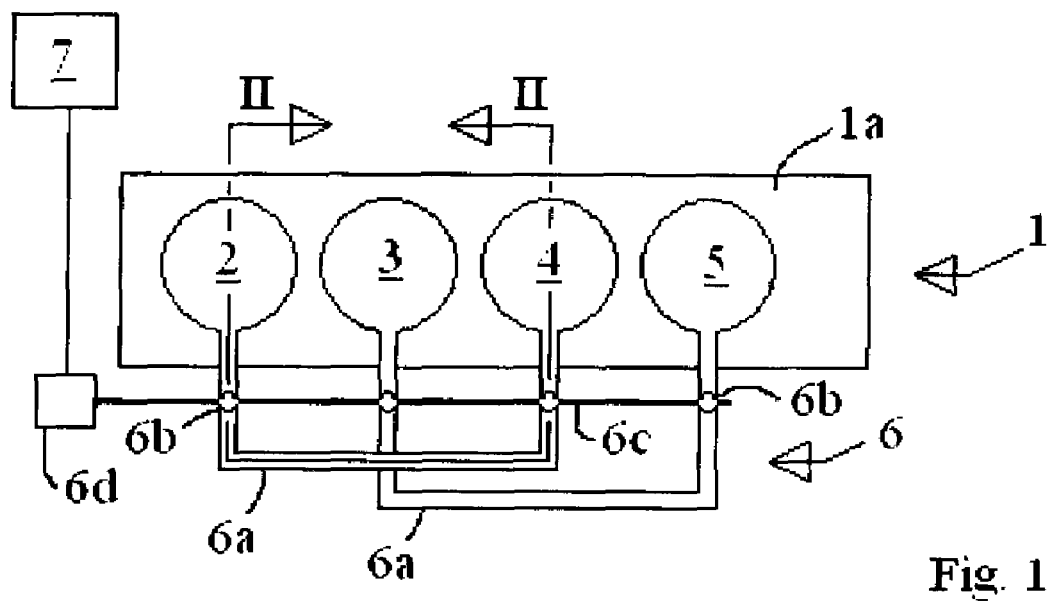

FIG. 1 shows a schematic top view of a part of an internal combustion engine 1 with an engine block 1a comprising four cylinders 2-5 arranged in-line. It should be noted that an engine comprising any number of cylinders, e.g. two, four, six, eight, or more may be used. The engine in this example is provided with a spark plug (not shown) at each cylinder, but it should be noted that the invention is equally applicable to an engine adapted to run with diesel cycles.

The cylinders are arranged in pairs so that the cylinders in each pair are connected by communication means 6, each comprising a conduit in the form of a tube 6a located externally of the engine block, further described below.

Figure 2:
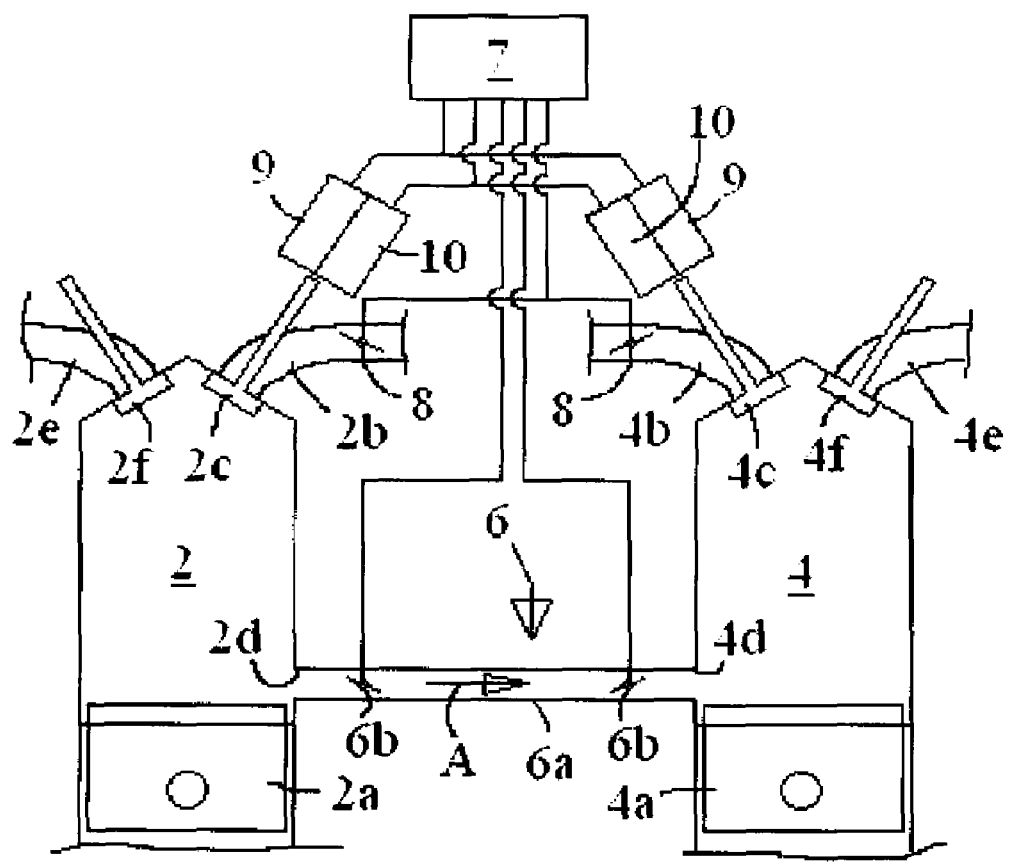
FIG. 2 is a cross-sectional view, with the section oriented along the line II-II in FIG. 1, FIGS. 2a and 2b show a detail an internal combustion engine according to another embodiment of the invention.

Referring to FIG. 2, the cylinders of each pair are here referred to as a first and a second cylinder 2, 4. At each cylinder 2, 4 a piston 2a, 4a and at least one inlet 2b, 4b for at least one combustion ingredient are provided, as well as at least one inlet valve 2c, 4c for controlling communication between the inlet and the cylinder 2, 4, as will be described closer below. In this example, there is no direct fuel injection, so the combustion ingredients transported through the inlets 2b, 4b are air and fuel. In addition, at each cylinder 2, 4, at least one outlet 2e, 4e for exhaust gases are provided, as well as at least one exhaust valve 2f, 4f for controlling communication between the outlet 2e, 4e and the cylinder 2, 4.

The phase difference of the cycles in the first and second cylinders 2, 4 is approximately 360 CA. A first and a second opening 2d, 4d to the communication means 6 are located at the cylinder wall of the first and second cylinder 2, 4, respectively. The respective pistons 2a, 4a are arranged to sweep during their reciprocating movements over the first and second openings 2d, 4d, respectively, to prevent communication between the first and second cylinders at the top dead center (TDC) piston positions, and allow communication at the bottom dead center (BDC) piston positions. More specifically, the first and second openings 2d, 4d are located such that they are not exposed to the combustion chamber when the respective piston 2a, 4a is above a certain distance from the BDC position. When the respective piston 2a, 4a move towards the BDC position, the first and second opening 2d, 4d are gradually increasingly exposed, and become fully exposed at the BDC position of the pistons. Thus, the position of the openings 2d, 4d in relation to the respective pistons 2a, 4a are decisive for the exposure timing of the communication means. As exemplified further below, preferably, the openings 2d, 4d start being exposed 30 CA before the BDC positions of the respective pistons, and thus the exposure terminates 30 CA after the BDC positions of the respective pistons.

Since the pistons 2a, 4a in the first and second cylinders 2, 4 moves essentially in parallel, and the cycle phase difference is 360 CA, the openings in the respective cylinders 2, 4 become essentially simultaneously exposed during a work stroke of the first cylinder 2 and an inlet stroke of the second cylinder 4. Further, the openings remain open and are gradually closed during an initial phase of an exhaust stroke of the first cylinder and a compression stroke of the second cylinder. Thus, the communication means 6 is exposed when the pistons 2a, 4a are located at or close to the BDC positions, so that it can transport combustion products, or residuals, from the first cylinder 2 to the second cylinder 4, as indicated by the arrow A in FIG. 2. The communication means 6 can be said to provide internal EGR (exhaust gas recirculation) between the cylinders.

Since, during the end of the work stroke of the first cylinder 2, the pressure is higher in the first cylinder 2 than in the second cylinder 4, operating in the inlet stroke, a large amount of combustion products can be allowed to enter the second cylinder 4. Thus, a "supercharge" of combustion products into the second cylinder 4 is provided, so that an effective cooling of the combustion in the second cylinder can be obtained.

Assuming that the engine is operating with four stroke cycles, when, at the end of the work stroke of the first cylinder 2, the combustion products have been transported as indicated in FIG. 2 by the arrow A, and the pistons 2a, 4a subsequently have passed the TDC positions, and approach again the BDC positions, the first cylinder 2 is at the end of an inlet stroke and the second cylinder 4 is at the end of a work stroke. Thereby, the openings 2d, 4d are again exposed by the pistons 2a, 4a, so that the communication means 6 can transport combustion products from the second cylinder 4 to the first cylinder 2, in a direction opposite to the arrow A in FIG. 2. Thus, communication via the communication means 6 is allowed alternatingly during on one hand a part of a work stroke of the first cylinder, and a part of an inlet stroke of the second cylinder, and on the other hand a part of an inlet stroke of the first cylinder, and a part of a work stroke of the second cylinder.

At the tube 6a of each communication means 6, two valve devices 6b are provided, each in the vicinity of a respective of the first and the second cylinder 2, 4. As can be seen in FIG. 1, the valve devices 6b for all cylinders in line are connected by a common control device, comprising a control rod 6c and a power device 6d. The power device 6d can be provided in any suitable form, e.g. as an electric engine or a hydraulic unit, and is in turn controllable by an engine control unit (ECU) 7. (The ECU 7 has computational capabilities and storage capabilities, and can be formed by one or more physically separate, but logically connected devices.) Thus, the valve devices 6b are controllable so as to selectively prevent communication via the communication means 6. The valve devices 6b, which can be provided in any suitable form, for example similar to butterfly valves as suggested in FIG. 2, are also adapted to assume an infinite amount of positions between fully open and fully closed positions, so that the flow through the communication means 6 can be controlled as desired, as explained further below.

Figure 2A:
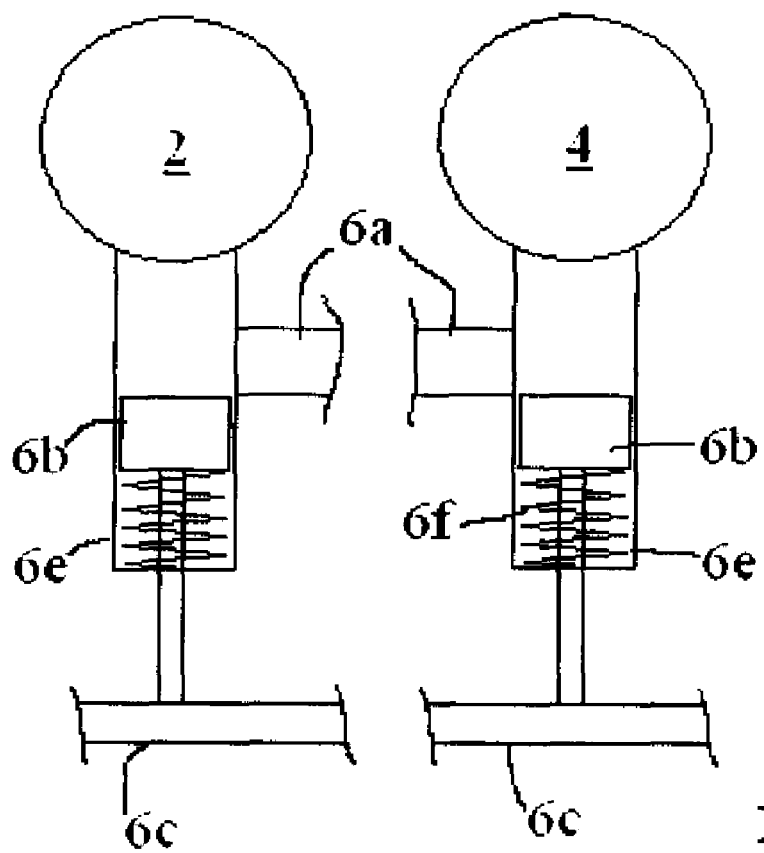
Figure 2B:
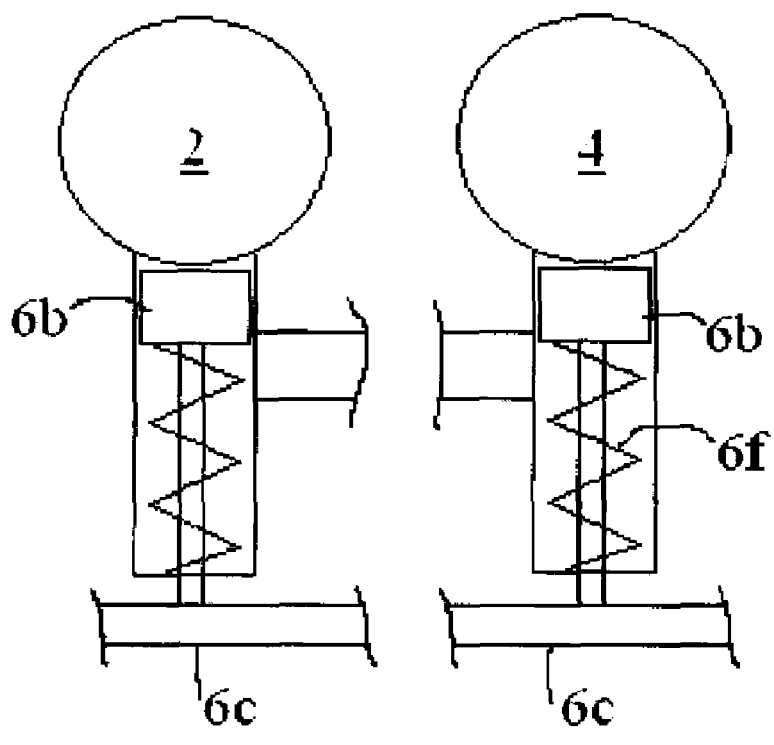

FIGS. 2a and 2b show an alternative embodiment of the valve devices 6b. Each valve device 6b is movable in a valve guide 6e, which could have a cylindrical internal shape, and which can communicate with the tube 6a. The valve devices 6b are connected via a control rod 6c, which is movable by a power device (not shown) in the direction of the valve guides 6e, so that the valve devices 6b can be selectively located so as to allow (FIG. 2a) or prevent (FIG. 2b) communication through the communication means 6. As can be seen in FIG. 2b, in the position in which such communication is prevented, the valve devices 6b are located close to the respective cylinders 2, 4, which is advantageous in operational modes in which the communication means are not utilised. Resilient means in the form of springs 6f force the valve devices 6b to take the position to prevent communication via the communication means 6 in the event of malfunction of the power device.

As an alternative, only one valve device 6b, or more than two, can be provided for each communication means 6.

In the embodiment described here, the communication means 6 have been provided in a manufacturing process as follows: At each cylinder a slot or an aperture has been provided, by a cutting or milling operation, in the side of the engine block to provide the openings 2d, 4d at suitable locations in relation to the piston BDC positions. Between the apertures at the cylinders in each pair, a bent tube 6a in a suitable material has been provided, and secured at its ends in a suitable manner to the engine block, and the valve devices 6b with the control device 6c, 6d has been fitted to the tubes 6a. Thus, the tubes 6a and valve devices 6b with the control device 6c, 6d are located externally of the engine block. This means that the communication means 6 can be provided in a simple and cost-effective manner as a "bolt-on" solution to existing engine models.

Nevertheless, the communication means 6 can be provided as a duct, a channel or any other suitable arrangement adapted for transporting gases between the first and second cylinders, and its transportation duct can be provided externally of the engine block, as described above, or inside the engine block, provided for example in a casting process of the engine block production.

As depicted in FIG. 2, the engine is also provided with a throttle valve 8 at each inlet 2b, 4b, controllable by the ECU 7 in a manner known in the art.

Further, the engine in also comprises a variable valve lift profile system 9, symbolically indicated in FIG. 2 at the inlet valves 2c, 4c. The variable valve lift profile system 9 is adapted to change the lift profile of the inlet valves 2c, 4c, i.e. the amount and duration of lift at individual valve motions. In this example, the variable valve lift profile system is provided in the form of a cam profile shifting (CPS) system, adapted to change the lift profile of inlet valves 2c, 4c, by changing the valve lift provided by camlobes on a camshaft (not shown). Alternatively, variable valve lift profile system can be provided with valves that can be actuated independently of each other, for example by use of electromagnetic actuators.

The engine also comprises a variable valve timing (VVT) system 10, symbolically indicated in FIG. 2 at the inlet valves 2c, 4c, The VVT system is adapted to set the camshaft at desired angular positions, so that the timing of the inlet valve 4c, 4c motions can be adjusted in relation to the piston 2a, 4a movements, in a manner known in the art.

The variable valve lift profile system and the VVT system are controllable via hydraulic, electric or mechanic arrangements by the ECU 7, in a manner known in the art.

Alternatively, engine 1 can be provided without a variable valve lift profile system, but with a VVT system adapted to adjust the timing of both inlet and exhaust valves. This is advantageous, since it provides similar control qualities for the combustion product introduction as in the case with a variable valve lift profile system, but without the complications and costs of such a system.

As a further alternative, the variable valve lift profile system can be adapted to control the exhaust valves 2f, 4f and the VVT system can be adapted to adjust the timing of the inlet valves 2c, 4c, or vice versa. Alternatively, the variable valve lift profile system can be adapted to control both inlet and exhaust valves.

Also provided are means (not shown) to establish the engine speed, and the rotational position of the crankshaft of the engine, in a manner known in the art.

Figure 3:
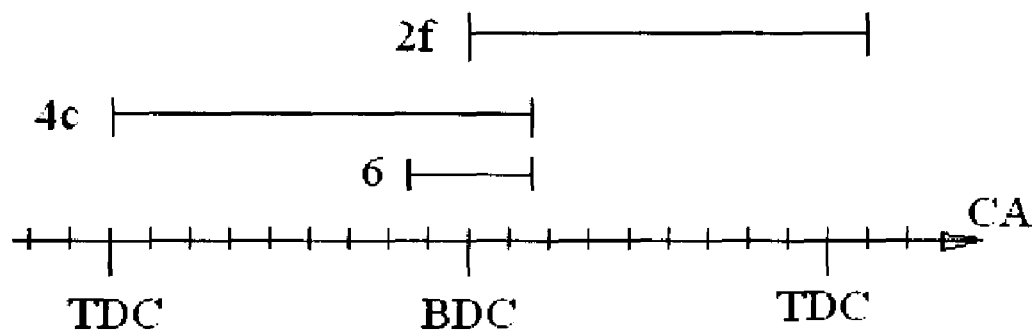
FIGS. 3-5 are diagrams showing exposure intervals in crankshaft degrees (CA) for conduits at cylinders of the engine in FIG. 1, FIGS. 6-7 are diagrams showing exposure intervals in crankshaft degrees (CA) for conduits at cylinders of an engine according to an alternative embodiment of the invention, FIG. 8 schematic top view of a part of an internal combustion engine according to a further embodiment of the invention.
Figure 4:
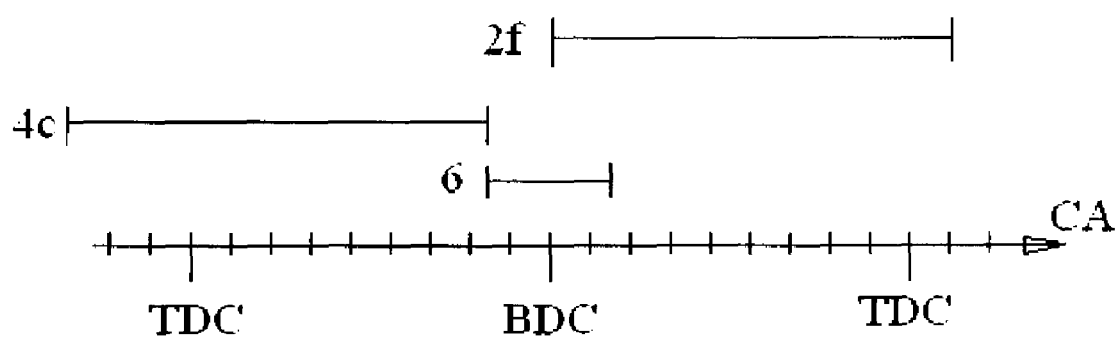
Figure 5:
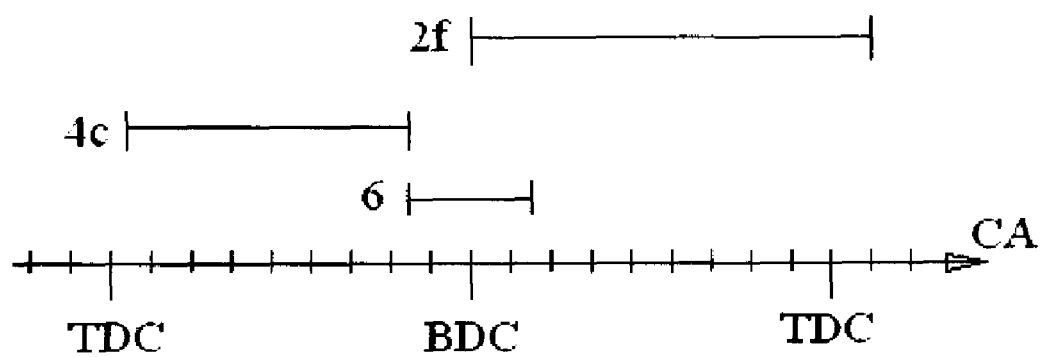

Referring to FIGS. 3-5. The VVT system, adapted to adjust the timing of the inlet valves 2c, 4c, can be used to control the amount of products transported through the communication means 6. As an example, the situation in which combustion products are transported from the first cylinder 2 to the second cylinder 4 can be studied.

In this example, the communication means 6 is exposed within an interval of 150-210 CA after the TDC positions of the pistons. In FIG. 3, the VVT is set so that the inlet valve 4c of the second cylinder 4 closes at the end of the exposure interval for the communication means 6. Thus, the inlet valve 4c will still be open when the when combustion products enters into the second cylinder 4 from the first cylinder 2. This will result in a relatively high ratio between combustion products and air, and also a relative low pressure in the second cylinder 4 at the beginning of the compression stroke thereof.

In FIG. 4, the VVT is set so that the inlet valve 4c of the second cylinder 4 closes before or at the beginning of the exposure interval for the communication means 6. (As can be seen in FIGS. 3 and 4, the timing of the exhaust valve 2f of the first cylinder is unchanged.) Thus, the inlet valve 4c will be closed when the combustion products enters into the second cylinder 4 from the first cylinder 2. This will result, compared to the case in FIG. 3, in a lower ratio between combustion products and air, and also a higher pressure in the second cylinder 4 at the beginning of the compression stroke thereof.

It should be noted that, since the VVT system provides for a large amount of settings between two end settings, the ratio between combustion products and air, and the pressure, can be controlled so that essentially any mixture and pressure properties can be obtained within the limits set by the VVT system 10.

FIG. 5 shows an alternative manner to control the pressure and combustion product content in the second cylinder 4. Here, variable valve lift profile system 9 is adjusted, in relation to the setting in FIG. 3, to provide a shorter lift duration of the inlet valve 4c of the second cylinder 4, so that it closes before or at the beginning of the exposure interval for the communication means 6. The result will be similar to that of the step described with reference to FIG. 4.

Figure 6:
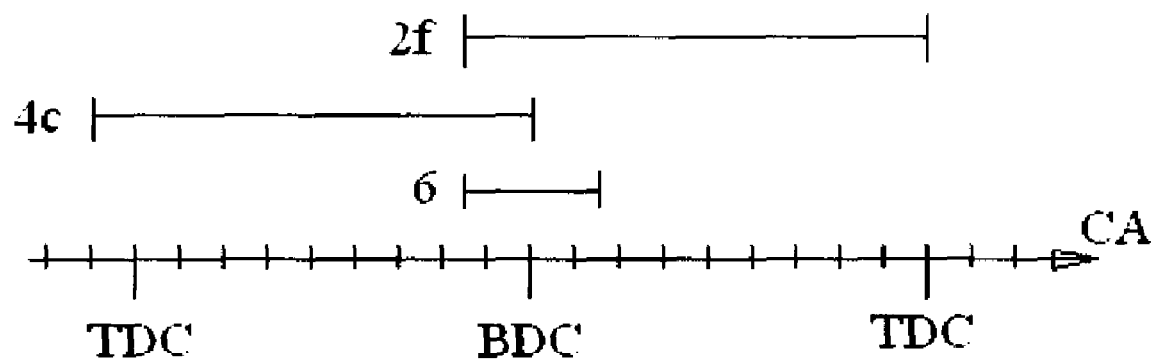

Reference is made to FIG. 6. As mentioned, as an alternative, the engine 1 can be provided without a variable valve lift profile system 9, but with a VVT system 10 adapted to adjust the timing of both inlet and exhaust valves 2c, 2f, 4c, 4f.

Figure 7:
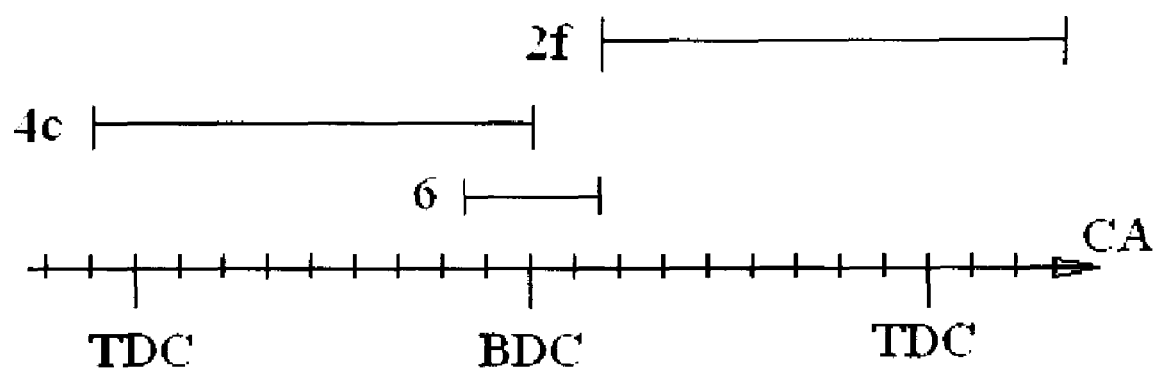

As in the example in FIGS. 3-5, the situation in which combustion products are transported from the first cylinder 2 to the second cylinder 4 is studied, and the communication means 6 is exposed within an interval of 160-200 CA after the TDC positions of the pistons. In FIGS. 6 and 7, the timing of the inlet valve 4c of the second cylinder is unchanged. In FIG. 6, the VVT is set so that the exhaust valve 2f of the first cylinder 2 opens at the beginning of the exposure interval for the communication means 6. Thus, the exhaust valve 2f will be open when the when combustion products enters into the second cylinder 4 from the first cylinder 2. This will result in a relative low pressure and a relatively low ratio between combustion products and air in the second cylinder 4 at the beginning of the compression stroke thereof.

In FIG. 7, the VVT is set so that the exhaust valve 2f of the first cylinder 2 opens at or after the end of the exposure interval for the communication means 6. Thus, the exhaust valve 2f of the first cylinder 2 will be closed when the combustion products enters into the second cylinder 4 from the first cylinder 2. This will result, compared to the case in FIG. 6, in a higher ratio between combustion products and air, and also a higher pressure in the second cylinder 4 at the beginning of the compression stroke thereof. The late exhaust valve opening provided by the exhaust VVT as described here is very advantageous at low engine speeds to avoid pressure decrease being too fast in the first cylinder for effective transportation of gases through the communication means 6.

Thus, together with a variable valve lift profile system 9, and/or a VVT system 10, the communication means 6 provide for large control possibilities for the mixture and pressure in the cylinders. It should be noted that the control methods described with reference to FIGS. 3-7 can be carried out with the inventive communication means 6 on conjunction with a standard variable valve lift profile system 9, and/or a standard VVT system 10, which makes the methods easy to apply to existing engine systems.

At low torques of the engine, the throttle valve 8 can be used to reduce the air flow in the inlets 2b, 4b during inlet strokes. In combination with the transport of combustion products through the communication means 6, this will provide for an elevation of the temperature in the cylinder receiving the combustion products. This in turn makes it possible to achieve a temperature sufficient for self-ignition in HCCI operation. Thus, the minimum torque level possible with HCCI operation can be reduced. It should be noted though that the invention is equally applicable to internal combustion engines without throttle valves.

It should be noted that the communication means 6 can be exposed within an interval different from the one in the examples above. The interval can be any interval suitable for transporting combustion products from the first to the second cylinder due to a higher pressure in the first cylinder after the beginning of a work stroke. Thus the communication means exposure interval could be distributed asymmetrically with respect to the BDC piston position, e.g. 120-180 CA, or 180-240. It could be longer than in the examples above, e.g. 135-225 CA, 90-180 CA, or 180-270 CA, or shorter, e.g. 160-200 CA, 140-180 CA or 180-220 CA.

Also, as an alternative to the examples above, the pistons in the first and second cylinders do not have to be moving in parallel. Instead, as an alternative, one of the pistons can be moving slightly in advance of the other. Preferably, in any case the phase difference of piston movements in the first and second cylinders is less than 20, more preferably less than 10 CA.

Figure 8:
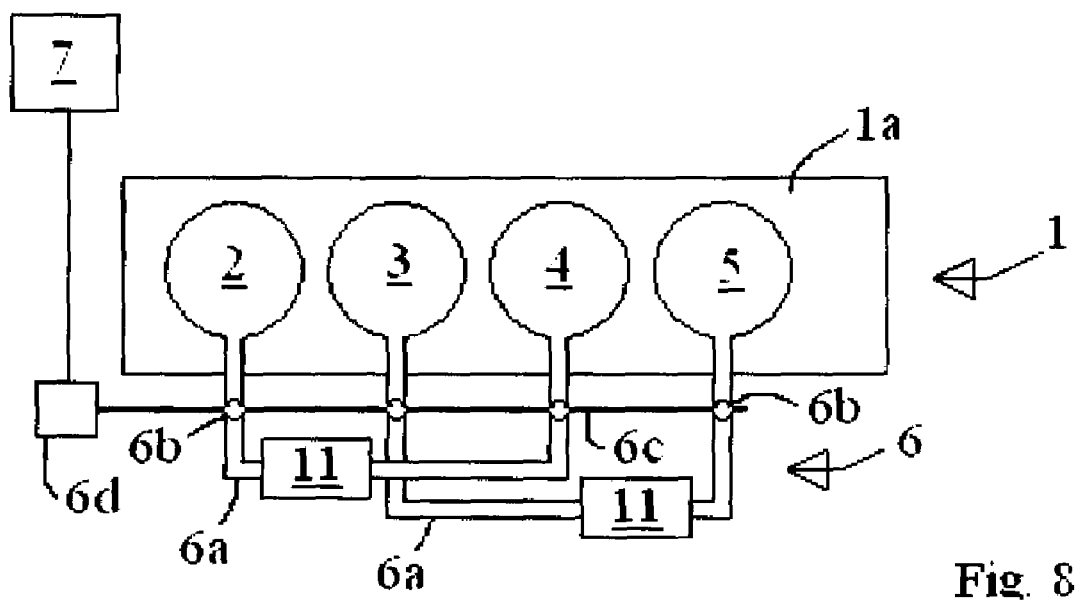

Reference is made to FIG. 8. Besides HCCI operation, the inventive communication means 6 described above can advantageously be provided for diesel operation. Thereby, in order to provide a temperature of the combustion products transported through the communication means 6, preferably cooling means 11, for example in the form of a heat exchanger, is provided at each communication means 6. This means that the cylinder during the inlet stroke of a diesel cycle can be almost entirely filled with air. It should be possible to provide 80% of air during the inlet stroke. Thereupon the air inlet can be closed similarly to what is described above with reference to FIG. 4, and gas transport through the communication means 6 made enabled. This provides for a very high volumetric efficiency, in combination with a high content of combustion products by the internal EGR provided by the communication means 6, and also a high pressure during the beginning of the compression stroke.

In addition, it should be mentioned that the invention is advantageously applicable for SI operation, to provide effective internal EGR while retaining a high volumetric efficiency. However, the valve devices 6b can be used to close the communication means 6 during periods of SI operation. It should be mentioned that the invention can provide smooth switches from an SI mode to a HCCI mode. The reason is that the first HCCI combustion in one cylinder is charged with extra hot combustion products from the last SI combustion in another cylinder, and this compensates for the walls of the communication means being relatively cold during a HCCI mode start-up phase.

Figure 9:
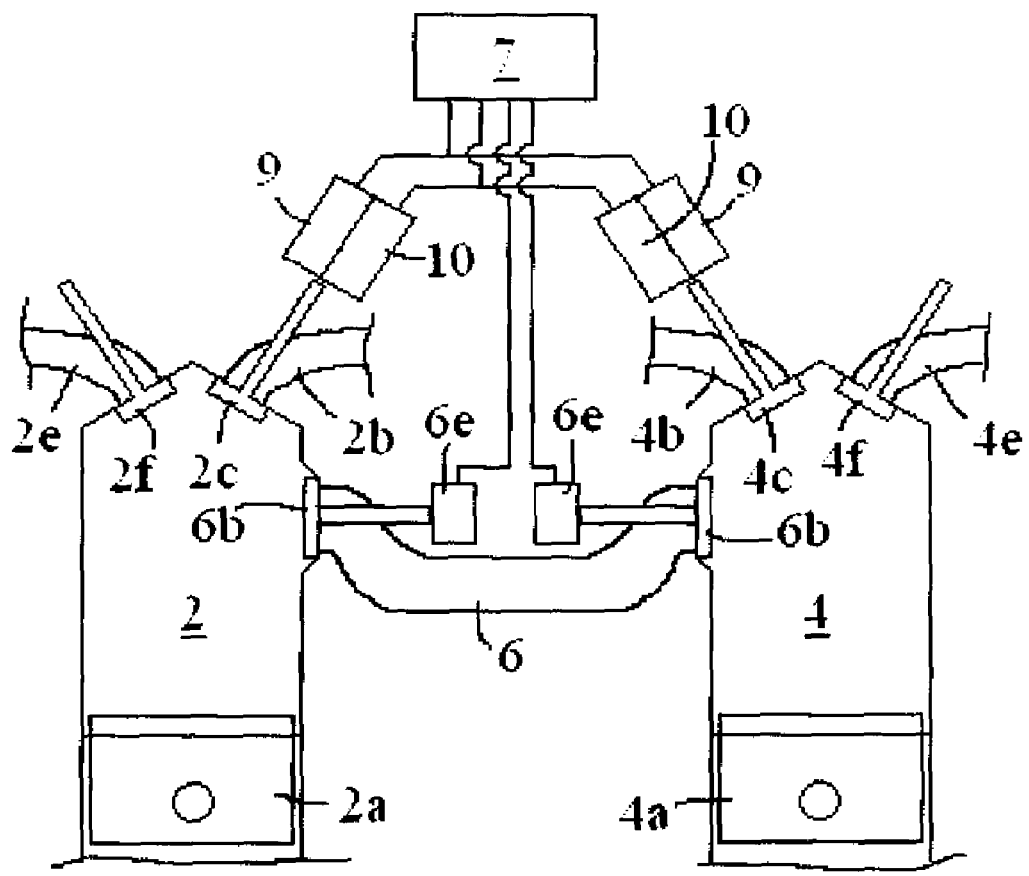
FIG. 9 is a cross-sectional view, similar to the one shown in FIG. 2, of an engine according to yet another embodiment of the invention.

Reference is made to FIG. 9, showing an alternative embodiment, presenting identical features to the embodiment described above with reference to FIGS. 1 and 2, except for the following: The communication means 6 comprises two valve devices 6b, each located at the cylinder wall of the first and second cylinders 2, 4, respectively. Each valve device 6b can have an appearance and function similar to traditional inlet and exhaust valves. Each valve device 6b is controlled by the ECU 7 via suitable valve actuation devices 6e, so as to open and close on a cycle-to-cycle basis, and thereby selectively expose the communication means 6 to the cylinders 2, 4. Thus, the valve devices 6b in FIG. 9 fills the same function in relation to the communication means 6, as the pistons 2a, 4a in the embodiment described above with reference to FIGS. 1 and 2.

It should be noted that the invention is equally applicable to cycles other than four stroke cycles, such as six stroke or eight stroke cycles, or in conjunction with cylinder deactivation operations.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An internal combustion engine comprising:
    at least two cylinders, each of the at least two cylinders having a reciprocating piston and at least one inlet for receiving at least one combustion ingredient;
    a communication conduit configured to provide selective fluid communication between a first cylinder of the at least two cylinders, and a second cylinder of the at least two cylinders, the communication conduit having a first state where the first cylinder and the second cylinder are in fluid communication and a second state where the first cylinder and the second cylinder are not in fluid communication; and
    a control system, the control system placing the communication conduit in the first state to provide fluid communication between the first cylinder and the second cylinder during at least a part of an engine operation period starting during a movement of a piston of the first cylinder towards a bottom dead center (BDC) position at a work stroke of the first cylinder and ending during a movement of the first piston away from the bottom dead center (BDC) position, during the engine operation period a piston of the second cylinder moves at least one of towards a bottom dead center (BDC) position and away from the bottom dead center (BDC) position, wherein the engine operation period, during at least a part of which communication is provided by the communication conduit, starts at 100 crankshaft degrees before the bottom dead center (BDC) position of the first piston.

2. The internal combustion engine according to claim 1, wherein the engine operation period, during at least a part of which communication is provided by the communication conduit, ends at 100 crankshaft degrees after the bottom dead center (BDC) position of the first piston.

3. The internal combustion engine according to claim 1, wherein the engine operation period, during at least a part of which communication is provided by the communication conduit, ends at 75 crankshaft degrees after the bottom dead center (BDC) position of the first piston.

4. Then internal combustion engine according to claim 1, wherein the phase difference of the cycles in the first and second cylinders is approximately 360 crankshaft degrees.

5. The internal combustion engine according to claim 1, wherein the communication conduit comprises:
    at least a first opening to the communication conduit located at a cylinder wall of the first cylinder; and
    at least a second opening in the communication conduit located at a cylinder wall of the second cylinder, the first and second openings not being exposed to the combustion chamber when the respective piston of the first and second cylinders is at a top dead center (TDC) position, and at least partially exposed when the respective piston of the first and second cylinders is at the bottom dead center (BDC) position.

6. The internal combustion engine according to claim 5, wherein the piston movements in the first and second cylinders are related to each other so that when the first opening is at least partly exposed, the second opening is also at least partly exposed.

7. The internal combustion engine according to claim 6, wherein the cycles in the first and second cylinders are related to each other in such a way that the openings in the respective cylinders become essentially simultaneously exposed at a work stroke of one of the first and second cylinders and at an inlet stroke of the other of the first and second cylinders.

8. The internal combustion engine according to claim 1, wherein the communication conduit further comprises:
    at least one valve device controllable by the control system to place the communication conduit in the first state and the second state.

9. The internal combustion engine according to claim 1, wherein the communication conduit is located substantially external of an engine block of the engine.

10. The internal combustion engine according to claim 9, wherein the communication conduit is removably coupled to the engine block.

11. A method for controlling transfer of combustion products between cylinders of an internal combustion engine, the engine having at least two cylinders, each cylinder including at least one intake valve, at least one exhaust valve, and a reciprocating piston, the engine further including a throttle valve and a communication conduit for providing selective fluid communication between only a first cylinder and a second cylinder of the at least two cylinders, the method comprising:

varying at least one of a valve timing and a valve lift to close the intake valve of the second cylinder to control the amount of combustion products transported through the communication conduit, wherein the combustion products only travel between the first cylinder and the second cylinder.

12. The method according to claim 11, further comprising:
varying at least one of a valve timing and a valve lift to open the exhaust valve of the first cylinder to control the amount of products transported through the communication conduit.

13. The method according to claim 11, further comprising:
adjusting a position of the throttle valve so as to reduce the air flow though the inlet of the second cylinder during an inlet stroke thereof based on a desired temperature of the second cylinder.

14. An internal combustion engine comprising:
at least two cylinders, each of the at least two cylinders having at least one intake valve, at least one exhaust valve, and a reciprocating piston;
a communication conduit configured to provide fluid communication between a first cylinder and a second cylinder of the at least two cylinders; and
a control system, the control system adjusting an operating parameter to enable selective fluid communication between the first cylinder and the second cylinder based on a combustion condition, wherein the internal combustion engine is a diesel engine and the communication conduit includes at least one heat exchanger to cool fluid passing between the first cylinder and the second cylinder;
wherein the combustion conditions includes homogeneous charge compression ignition operation and wherein the operating parameter is at least one of exhaust valve closing time of the first cylinder and intake valve opening time of the second cylinder, the valve timing being adjusted to provide fluid communication between the first cylinder and the second cylinder for combustion products to pass from one cylinder to the other cylinder to facilitate HCCI combustion.

15. The communication conduit according to claim 14, further comprising:
a valve for providing selective fluid communication between the first cylinder and the second cylinder, the valve controllable by the control system, the operating parameter including a position of the valve, wherein the control system adjusts the valve to an open position during homogeneous charge compression ignition operation and the control system adjusts the valve to a closed position during spark ignition operation.

16. The internal combustion engine according to claim 14, wherein the control system is configured to operate in a first mode of operation where the at least one exhaust valve of the first cylinder opens at a bottom dead center (BDC) piston position and the at least one intake valve of the second cylinder closes after the bottom dead center (BDC) piston position, in a second mode of operation where the at least one exhaust valve of the first cylinder opens at the bottom dead center (BDC) piston position and the at least one intake valve of the second cylinder closes before the bottom dead center (BDC) piston position, in a third mode of operation where the at least one exhaust valve of the first cylinder opens before the bottom dead center (BDC) piston position and the at least one intake valve of the second cylinder closes at the bottom dead center (BDC) piston position, in a fourth mode of operation where the at least one exhaust valve of the first cylinder opens after the bottom dead center (BDC) piston position and the at least one intake valve of the second cylinder closes at the bottom dead center (BDC) piston position, and wherein the control system selects the mode of operation based on the combustion condition.

* * * * *